Patented Jan. 17, 1928.

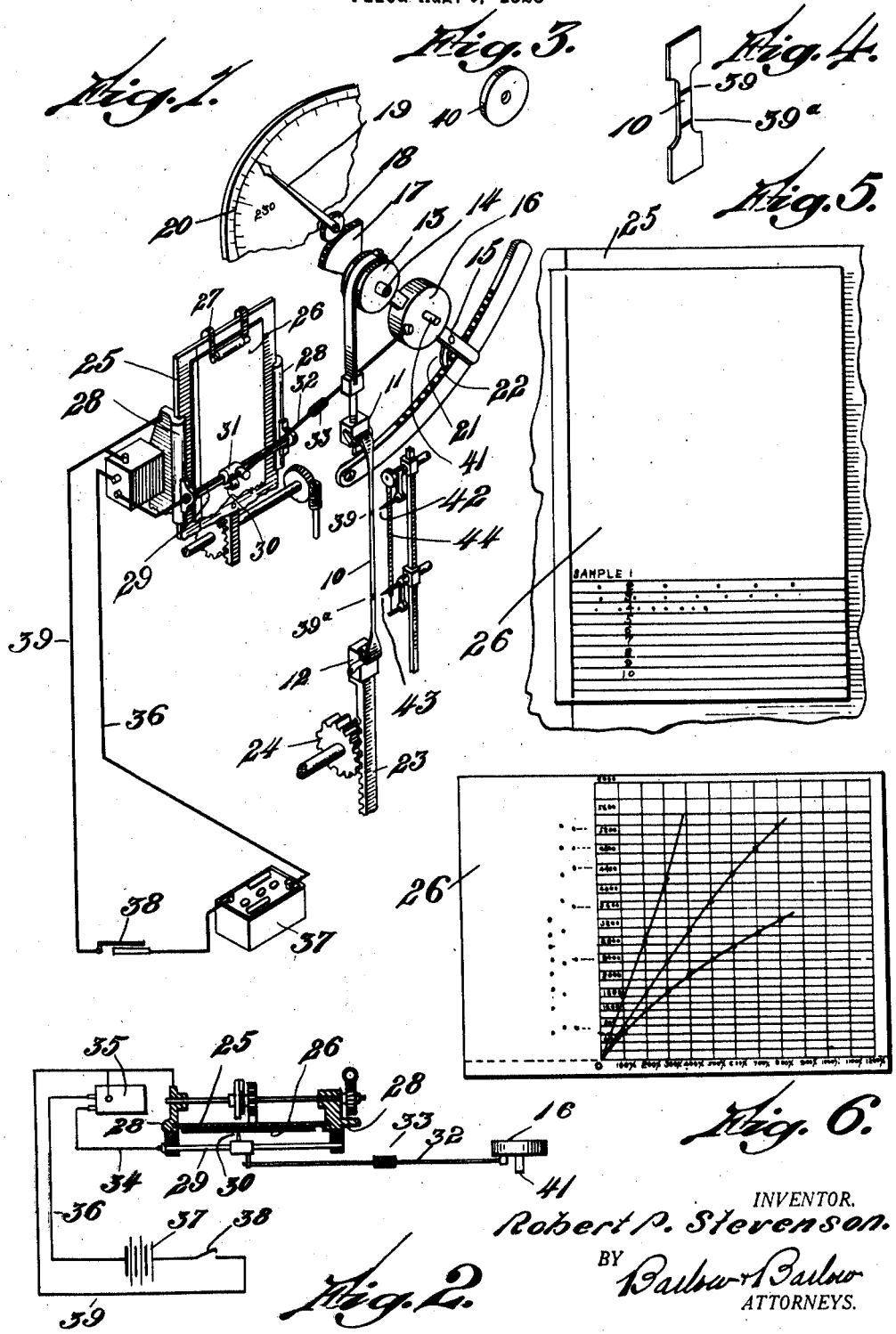

1,656,246

UNITED STATES PATENT OFFICE.

ROBERT P. STEVENSON, OF PROVIDENCE, RHODE ISLAND, ASSIGNOR TO HENRY L. SCOTT COMPANY, OF PROVIDENCE, RHODE ISLAND, A CORPORATION OF RHODE ISLAND.

STRETCH-TESTING MACHINE.

Application filed August 9, 1926. Serial No. 128,270.

This invention relates to an improved machine for testing elongatable material such as rubber or the like; and has for its object to provide means for passing an electric spark through a specially prepared chart from the back to the front thereof at predetermined intervals as the pointer terminal of the spark gap is moved along its rear surface to indicate on its front side as the stress strain is applied to the sample being tested whereby the chart may be removed from the machine and these points project to corresponding percentage lines on its front face and a curve drawn through the plotted points, which curve represents the behavior of the sample elongated without further mathematical calculations.

A further object of the invention is to provide means for varying the resistance to the pull on the upper work gripping jaw.

With these and other objects in view, the invention consists of certain novel features of construction, as will be more fully described, and particularly pointed out in the appended claims.

In the accompanying drawings:

Figure 1 is a diagrammatic view illustrating a sample being tested and the compensating weight as connected to and insulated from the spark point; also representing an electric circuit adapted to be closed by a foot operated switch.

Figure 2 is an edge view partly in section showing a platen with a chart mounted thereon and the spark point as mounted on a guide bar to be moved horizontally along the surface of the chart, the point being connected to and insulated from the compensating weight.

Figure 3 is a perspective view of one of the removable compensating weights adapted to be applied to the weight arm.

Figure 4 is a view showing a general shape of sample of rubber to be tested.

Figure 5 shows the rear face of the chart as placed to the front when the chart is applied to the supporting platen.

Figure 6 shows the ruling on the front face of the chart and also shows the indicating points which were pierced from the back of the chart while in position on its platen and the curves plotted from these points on the front by projecting these points across to the different vertical lines on the face of the chart.

Rubber samples are tested to obtain their tensile strength per square inch and the standard samples have a middle portion one-quarter inch in width by one-tenth of an inch in thickness and the standard way of charting a curve to indicate the behavior of the sample tested is so as to read from the left to right on the chart and in order to produce such a reading on a standard rubber testing machine, I have arranged a specially ruled chart which consists essentially of a letter size sheet of paper on the front face of which is laid off a plurality of spaced, intersecting, right-angularly disposed lines.

The axis of abscissæ or zero poundage line is a horizontal line at the bottom of the sheet reading in percentage of elongation or stretch of 100% beginning at zero and the axis of ordinates reading upwardly from zero at the left side in pounds per square inch. The sheet is provided with an unruled space at the left. The reverse side or rear face of this sheet has a line across one side coinciding with the zero poundage line on the front and the rear face is ruled at right angles to the zero line at a portion coinciding with the unruled portion on the front. This ruled portion on the rear face is numbered consecutively to designate the different samples tested. The operator now places the chart on a sparking platen which forms one terminal of the spark gap of the machine with the reverse side or rear face outwardly, he then positions the spark point or other terminal of the spark gap on the vertical zero line and starts the machine. At each 100 percent of elongation or stretch of the sample and at the break he closes the circuit by a foot switch and causes an electric spark of high tension to pass from the pointer through the paper to the platen behind it. After this has been accomplished and one or more tests has been made, the chart is removed and reversed side for side, and the punctured points are projected to the corresponding vertical percentage lines and the curve plotted, which curve represents pounds per square inch at each 100 percent elongation of the sample being tested. By this method the stress strain is graphically indicated without further mathematical calculations; and the following is a detailed description of the present embodiment of my invention and showing one form of mechanism by which these advantageous results may be accomplished:—

With reference to the drawings, 10 designates a rubber sample being tested which is usually of dumb-bell shape, one end being connected to the clamp 11, its opposite end to the clamp 12. The clamp 11 is supported on the head 13 which is pivotally mounted on the shaft 14. To this head is connected a depending weight arm 15 carrying a weight 16.

On this shaft 14 is mounted the segments 17 meshing with a pinion 18 to move the pointer 19 over the face of the graduated dial 20 to indicate in pounds or other unit of measure the pull being exerted during the testing operation.

The weight arm is provided with a ratchet pawl 21 in engagement with the rack 22 to prevent the arm from returning after the sample has been ruptured.

Power is herein shown as being applied to the lower end of the sample through a rack 23 and pinion 24.

An electrical conducting platen 25 is supported adjacent the weight arm on which the chart 26 is supported by the clamps 27. The platen is movable vertically in the guides 28. On these guides and insulated therefrom is supported a guide rod 29 on which is slidably mounted a spark pointer 30 and this pointer has a bearing 31 which is connected to the weight 16 through the rod 32 which is insulated therefrom by the member 33.

In order to provide a high tension electric circuit, I have connected a wire 34 to the end of this guide rod 29 which is connected through a coil 35, wire 36 to the battery 37 and switch 38 back through wire 39 to the platen guide frame 28 whereby when this foot switch is operated it closes the circuit and causes the spark to jump from the point 30 through the chart 26 to the platen 25 on which it is supported.

The high tension spark is of sufficient force to puncture the chart so that these points of puncture may be readily discernable on the opposite side or front face of the chart.

The standard sample 10 of rubber is preferably formed of dumb-bell shape, as illustrated in Figure 4, having a middle reduced portion having marks as at 39 to represent an inch of space therein on its surface. This sample is then connected between the upper and lower clamps 11 and 12.

Before the test this sample is carefully calibrated and if it is of the standard size of one-quarter inch in width by exactly one-tenth inch in thickness the standard weight 13 on the weight arm 15 is employed, but if the thickness should be greater than standard, a greater weight is employed for the arm, for instance, one pound of weight is added for each 1/5000 variation in the thickness of the sample, so that if the sample is thicker than the standard, an additional weight 40 to properly compensate for these differences will be applied to the stud 41 on the weight 16.

The power applying mechanism is now started usually through an electric motor (not shown). A pair of trammel points 42 and 43 are supported in position along the sides of the sample being tested. These points are moved over a graduated scale 44, the upper trammel 42 being moved downwardly slowly to follow the upper mark 39 on the work to compensate for the stretch of the upper portion thereof and the downwardly yielding movement of the upper clamp jaw, while the lower trammel point 43 is moved downwardly over the scale following the lower mark 39$^a$ to indicate the stretch of the sample.

At each 100 percent elongation of the sample is indicated by these trammel points, the operator presses the foot switch 38 and closes the circuit, thus causing the spark to jump through the paper and puncture the chart at these different intervals of stretch and also again at the point of breaking. After this sample has been broken the mechanism is returned to starting position, another sample is positioned between the clamps 11 and 12, the pointer is automatically moved back to its starting position when the weight 16 is released to swing back to zero, the platen with its chart is moved upwardly one line, and the operation above described is repeated and which operation is repeated with each sample tested.

After the test is completed the chart is removed from the platen, turned over with its front side outward then the different points in each row of punctures are projected progressively across to the corresponding percentage line on the chart and the curve for each of the different samples is drawn through its plotted points, which curve represents the pounds pull per square inch of each one hundred percent elongations of the sample, which result is accurately obtained without further mathematical calculations thus saving much time and eliminating mistakes that might occur in making such calculations.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a rubber testing machine, means for stretching the rubber sample, means for measuring the tension on the sample, a spark gap, a chart in said gap, means operating by said measuring means to vary the position of said gap relative to the chart, an electric circuit connecting said gap, and means for manually controlling the electric circuit to cause a spark to jump said gap and pierce said chart at any predetermined point of stretch of said sample.

2. In a rubber tester, means for progressively applying a testing strain to a rubber sample, means for measuring the elongations, means for measuring the pounds pull on the sample in combination with a chart carrying platen, a chart on the platen, an electric circuit, a sparking point in said circuit means for moving said point along the surface of the chart, and means for closing the circuit at predetermined intervals to cause a spark to jump from said point through the chart to indicate on the reverse side as the point is moved along its surface.

3. In a rubber tester, means for progressively applying a testing strain to a rubber sample, means for measuring the pounds pull on the sample, in combination with a chart-carrying platen, a chart on the platen, an electric circuit, a sparking point in said circuit means for moving said point along the surface of the chart, and means by which the circuit may be closed at predetermined intervals to cause a spark to jump from said point through the chart to indicate on the reverse side thereof as the point is moved along its surface, and means for varying the resistance to the pull on the upper work gripping jaw.

4. In a rubber tester, means for progressively applying a testing strain to a rubber sample for measuring the elongation of the sample, means including a compensating weight arm and a graduated dial for measuring the pounds pull on the sample, a chart-carrying platen, an electric circuit, an insulated sparking point mounted to be moved along the face of the chart mounted on the platen, an insulated connector between said point and weight arm for advancing said point, and a switch for closing the circuit at desired intervals to cause a spark to jump and burn through the chart supported on the platen.

5. In a rubber tester, means for progressively applying a testing strain to a rubber sample, means for measuring the elongation of the sample, means including a compensation weight arm and a graduated dial for measuring the pounds pull on the sample, a chart-carrying platen, an electric circuit, an insulated sparking point mounted to be moved along the face of the chart mounted on the platen, an insulated connection between said point and weight arm through which said point is advanced, a switch for advancing said point, a switch for closing the circuit at desired intervals to cause a spark to jump through and pierce the chart carried by the platen, and means whereby the weight of said compensating arm may be varied to compensate for the pull on test samples of different areas.

In testimony whereof I affix my signature.

ROBERT P. STEVENSON.